March 3, 1970     A. H. BELLOWS     3,498,194
CAMERA EXPOSURE APPARATUS
Filed Sept. 15, 1967

INVENTOR.
Alfred H. Bellows
BY
Brown and Mikulka
ATTORNEYS

United States Patent Office 3,498,194
Patented Mar. 3, 1970

3,498,194
CAMERA EXPOSURE APPARATUS
Alfred H. Bellows, Cambridge, Mass., assignor to Polaroid Corporation, Cambridge, Mass., a corporation of Delaware
Filed Sept. 15, 1967, Ser. No. 668,132
Int. Cl. G01j 1/00, 1/52
U.S. Cl. 95—10        7 Claims

ABSTRACT OF THE DISCLOSURE

A shutter-diaphragm apparatus for a camera including means for automatically controlling operation relative to prevailing light conditions. A shutter-diaphragm component is driven by electromagnetic means such as a solenoid which receives a pulse from a charged capacitor. A stored charge in the capacitor, corresponding in terms of voltage to the ambient light level, is provided by three coacting resistance components, namely, a dividing resistor, a photoresistor and a shaping resistor, to effect correct aperture settings.

---

Objects of the invention are to provide electrically driven shutter-diaphragm apparatus in which voltage employed for charging a capacitor adapted, in turn, to produce a driving pulse to electromagnetic shutter-diaphragm actuating means, is automatically and correctly varied in accordance with prevailing levels of ambient light to effect correct aperture adjustments; to provide apparatus of the character described wherein the voltage is produced by a battery and is controlled by resistance means including a dividing resistor, a photoresistor and a shaping resistor serving in coacting capacities; to provide apparatus as set forth in which shutter-blade means are driven by a solenoid in response to pulses of varying magnitude from the charged capacitor; to provide aparatus as defined wherein charging and discharging of the capacitor is determined by manually-operable switching means; to provide apparatus of the type characterized which includes complementary flash-actuating means; and to provide apparatus of the category described in which the charging voltage is proportional to the square-root of the power eventually dissipated through the solenoid, wherein the movement of the shutter blades in response to differential pulses is substantially isochronous, and wherein the displacement of the shutter blades is approximately proportional to the square-root of the aperture area.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawing wherein.

Figure 1:
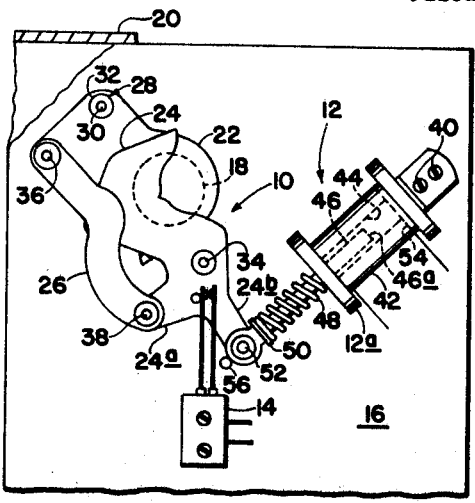
FIGURE 1 is a diagrammatic rear view of the shutter-diaphragm components at closed position.

Referring now to the drawing, a shutter-diaphragm element 10, a solenoid 12, and flash-contact means 14 are mounted on a plate or web 16 adjacent to an exposure aperture 18 identified with a frontal housing portion 20 of a camera. The shutter-diaphragm element 10 includes a pair of blades 22 and 24 and interconnecting linkage 26. Blade 22 is pivotally mounted on the plate 16 at 28, as for example, by a suitable grooved stud 30 and a slotted retaining washer 32. Similar pivotal mounting means or means of any other suitable type, may be utilized wherever a pivotal mounting of elements is described, the exact structure thereof being considered as unnecessary of repetition in each instance.

The blade 24, in the form of a modified bellcrank, overlies blade 22 and is pivotally mounted on the plate 16 at 34. The curved or angled link 26 overlies both blades 22 and 24. It is pivotally connected at 36 to blade 22 and to an extremity of a first arm 24a of blade element 24 at 38. The lens aperture 18, normally covered by the closed shutter-diaphragm blades 22 and 24, as in FIG. 1, is shown in a slightly uncovered or open condition by the partially open blades of FIG. 2 and at a maximum opened position in FIG. 3.

The solenoid 12 is fixedly attached at 40 to the mounting-plate 16. It includes a conventional cylindrical coil component 42 having a central longitudinal bore or aperture 44, a movable core or plunger 46, and an extension-type return-spring 48 bearing, respectively, against the end-piece 12a and the flange 50 of core 46. The outer end of core component 46 is pivotally attached at 52 to an extremity of the second arm 24b of blade element 24. When the coil 42 is electromagnetically energized, the movable core 46 is drawn inwardly of the bore to the limit provided by contact of its extremity 46a with a limit-stop element such as a small plate 54. The later may be composed of a metal, a plastic or a more pronouncedly shock-absorbing resilient material such as a synthetic rubber, a felt, etc.

Figure 2:
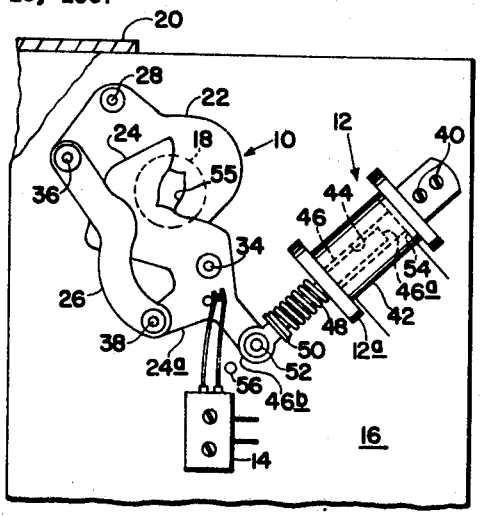
FIG. 2 is a similar view of the shutter-diaphragm components at a partially-open position.
Figure 3:
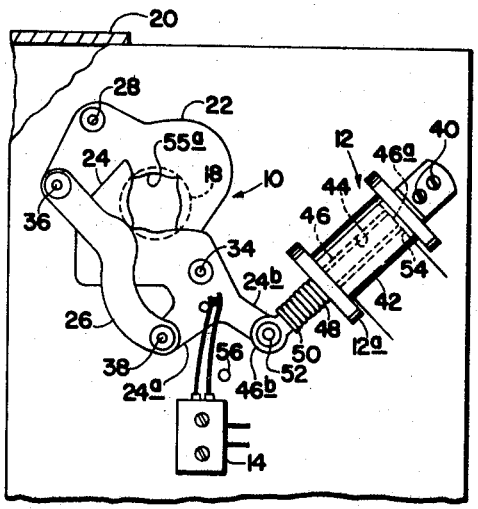
FIG. 3 is a diagrammatic rear view of the shutter-diaphragm components at a fully-open position.

Upon movement of the core component 46 inwardly of the bore 44 under the electromagnetic action of coil 42, in response to a pulse of a given intermediate magnitude, the shutter blades are brought to the partially open condition illustrated in FIG. 2 to provide the aperture 55. The spring 48 is thus compressed by a given amount. Upon termination of the electromagnetic force, the core 46 is biased to its maximum outward position in a reciprocative movement by the force applied by the extending spring 48 and the shutter is returned to the completely closed condition of FIG. 1. The limit of outward travel of the core 46 is determined by contact of its outer extremity 46b with a limit-stop pin 56, the latter, optionally, being faced with a resilient material for shock-absorbing purposes. In FIG. 3 the core component 46 has been drawn inwardly to its limit, provided by contact of surface 46a with limit stop 54, in response to a pulse of maximum strength. Accordingly, the shutter blades 22 and 24 have assumed an extreme open position producing the aperture 55a. It will, of course, be understood that various other apertures intermediate of those illustrated would be achieved for other levels of ambient illumination. The flash contact element 14 is so constructed and arranged as to provide a desired synchronization of a flash unit, not shown, to produce a flash at a given opening of the shutter blades.

Figure 4:
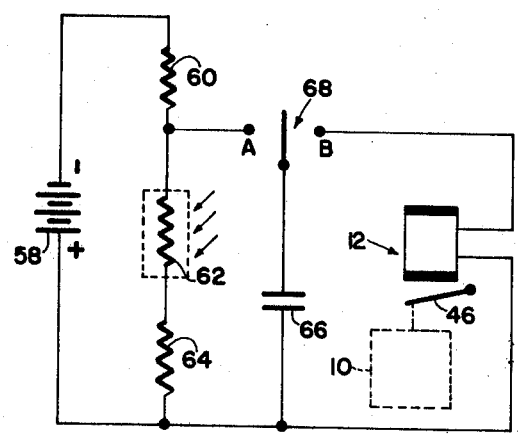
FIG. 4 is a wiring diagram of the electrical circuit of the apparatus.

The electrical circuit for energizing the solenoid 12 and thereby actuating the shutter-diaphragm blades is shown in FIG. 4. It includes the battery 58 which, in the example given, is rated at 27 volts; the dividing resistor 60 having a resistance of 2400 ohms; the photoresistor 62 having a logarithmic resistance of 3700 ohms at 100 candles per square foot; the shaping resistor 64 having a resistance of 3300 ohms; the capacitor 66 of 1000 microfarads capacitance; the solenoid 12 which, suitably, has a nominal power-rating of 2 watts and a maximum travel of the core 46 of ¼ inch; and the single-pole-double-throw switch 68.

Assuming a given appropriate tensioning capability or elasticity of the return-spring 48, there is provided an open-closed cycle of shutter operation of approximately ¼₀ second, the operation being substantially isochronous for relatively-different shutter-diaphragm openings, as hereinbefore intimated. At the aforesaid shutter speed, a suitable closing of the flash contacts may be considered as occurring approximately 5 milliseconds prior to opening of the shutter blades. It will be recognized that the shutter speed is subject to variation through modification of the characteristics of one or more of the above-enumerated components. The apparatus of the subject invention, although not limited thereto, is particularly adapted to photography under prevailing low-level light conditions in conjunction with flash illumination. Thus, for example, where the ambient light-level is below 100 candles per square foot, a flash unit may advantageously be employed.

In brief, operation of the circuit of FIG. 4 is as follows. When the movable switch element is closed with contact A, voltage from battery 58, as controlled by the interaction of resistors 60, 62 and 64, is applied to capacitor 66. Upon closing the movable switch element with contact B, the capacitor discharges across the solenoid 12 in the form of a pulse which draws the core 46 inwardly and opens the shutter-diaphragm. The degree to which the shutter-diaphragm opens is proportional to the magnitude of the pulse and is illustrated in FIGS. 2 and 3. Upon opening of the switch 68, the shutter-diaphragm blades close, under the bias of spring 48, to the position of FIG. 1. Where the ambient light-level is high, the resistance in the circuit is low, the capacitor 66 is only partially charged and the shutter-diaphragm opens by a given amount which is less than full aperture; where the light-level is low, the resistance is high, the capacitor is fully charged and the shutter-diaphragm opens to full aperture.

Figure 5:
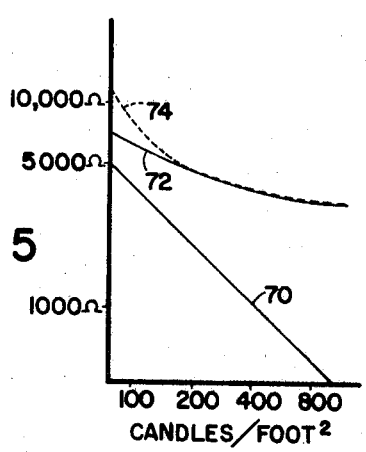
FIG. 5 is a graphic representation of resistance with special reference to a desired logarithmic resistance curve.

The function of the resistor components of the circuit of FIG. 4 will now be given in greater detail, with reference to the graphic representation of FIG. 5. The voltage across the three resistors 60, 62 and 64 remains constant and is equal to the battery voltage. The dividing resistor 60 is outside of the capacitor circuit when switch 68 is at the A position and serves to divide the fixed voltage into two parts proportional to resistor 60 and the sum of resistors 62 and 64, respectively. Only that portion of the voltage across resistors 62 and 64 charges the capacitor. The photoresistor 62 has a negative linear relationship to the incident light, as indicated by photoresistor curve 70, that is, for a two-fold increase in the incident light the resistance decreases by a factor of two. This linear relationship, however, is unsatisfactory for the proper operation of the shutter because of several nonlinearities existing between the light conditions and the required charging voltage. These nonlinearities arise from the fact that the desired displacement of the shutter blades is proportional to the square-root of the aperture area while the movement of the shutter blades is approximately isochronous, and because the charging voltage is proportional to the square-root of the power eventually discharged through the solenoid. These two factors and other minor mechanical aspects of the shutter result in the required resistance curve 74 which flattens considerably at the higher light levels. This flattened resistance curve can be very closely approximated over most of the range, as indicated by the curve 72, by shaping the linear photoresistor curve 70 through the instrumentality of the resistor 64. Shaping of the photoresistor curve 70 is accomplished by reason of the fact that interposition of the resistor 64 results in less total resistance change at the high light levels, at which the resistance of photoresistor 62 is low, than at the low light levels, where the resistance thereof is higher and more significant than that of the shaping resistor 64.

Although the shutter-diaphragm shown is of a two-bladed construction and constitutes a preferred example, it will be understood that a somewhat different basic structure thereof or a different number of blades could be employed for the purpose in conjunction with a solenoid driving element of chosen electromagnetic and physical characteristics and a circuit of the type shown. While a solenoid is especially suitable as a driving element in the structures illustrated, it will be obvious that other electromagnetic means, e.g., an electromagnet having a movable magnetic member such as an armature, could be employed for the purpose.

As will be apparent, the shutter mechanism includes the self-cocking feature provided by the return-spring 48. It will also be understood that the tensioning properties of the spring 48 are carefully predetermined with respect to the pulse magnitude and to the electromagnetic characteristics of the solenoid to provide the substantially constant time factor relative to movement of the shutter-diaphragm blades.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Shutter-diaphragm apparatus for incorporation with a camera to provide a variable aperture control thereof which is consistent with variations in the environmental light-level, comprising movable shutter-diaphragm blade means adapted in operation to assume a closed position and to form a plurality of exposure apertures of various size, electromagnet means mounted adjacent to said blade means including an energizable coil, a movable magnetic member, means biasing said member for movement relative to said coil, means connecting said movable member to said blade means, and means for energizing said coil to provide movement of said movable member and connected blade means, said energizing means comprising an electrical circuit including a source of direct-current voltage, a capacitor of given capacitance, resistance means having a voltage thereacross substantially equal to that of said voltage source and including a dividing resistor, a photoresistor and a shaping resistor, and switching means adapted to adternately charge and discharge said capacitor, said switching means at a first position being so connected relative to said resistance means as to exclude said dividing resistor and utilize only that portion of said voltage which is applied across said photoresistor and shaping resistor for a charging purpose, the charge on said capacitor being released by said switching means at a second position as an actuating pulse to the coil of said electromagnet means.

2. Shutter-diaphragm apparatus, as defined in claim 1, wherein said electromagnet means is a solenoid.

3. Shutter-diaphragm apparatus, as defined in claim 1, wherein said blade means is in the form of a plurality of pivotally-mounted blades and said movable member is pivotaly connected to an arm portion of one of said blades.

4. Shutter-diaphragm apparatus, as defined in claim 3, wherein said blade means is a pair of pivotally-mounted blades interconnected by linkage means.

5. Shutter-diaphragm apparatus, as defined in claim 1, wherein said biasing means is an extension spring serving to return said blade means to said closed position.

6. Shutter-diaphragm apparatus, as defined in claim 1, wherein is included flash contact means adapted to be actuated by said blade means.

7. Shutter-diaphragm apparatus, as defined in claim 1, wherein the movement of the shutter blades is substantially equal in time for each of said plurality of exposure apertures.

References Cited

UNITED STATES PATENTS

| | | | |
|---|---|---|---|
| 2,999,445 | 9/1961 | Fahlenberg | 95—63 |
| 3,020,816 | 2/1962 | Frenk. | |
| 3,208,365 | 9/1965 | Cooper et al. | |
| 3,362,309 | 1/1968 | Cooper, et al. | |
| 3,393,621 | 7/1968 | Kitanosono et al. | 95—11.5 |
| 3,421,427 | 1/1969 | Starr | 95—63 |

NORTON, ANSHER, Primary Examiner

J. F. PETERS, Jr., Assistant Examiner

U.S. Cl. X.R.

95—53, 63; 317—124; 250—215